United States Patent [19]

Asthana et al.

[11] Patent Number: 5,031,993
[45] Date of Patent: Jul. 16, 1991

[54] DETECTING POLARIZATION STATE OF AN OPTICAL WAVEFRONT

[75] Inventors: Rahul Asthana, Wilmington; Robert D. Miller, San Jose; Franklin M. Schellenberg, Cupertino; Glenn T. Sincerbox; James M. Zavislan, both of San Jose, all of Calif.

[73] Assignee: International Business Machines Corporation, Armonk, N.Y.

[21] Appl. No.: 438,300

[22] Filed: Nov. 16, 1989

[51] Int. Cl.⁵ .............................................. G02B 6/34
[52] U.S. Cl. .............................. 350/96.19; 350/96.15; 350/370
[58] Field of Search ................ 350/96.15, 96.16, 96.19, 350/370, 400, 401, 406

[56] References Cited

U.S. PATENT DOCUMENTS

| | | | |
|---|---|---|---|
| 4,723,829 | 2/1988 | Koonen | 350/96.19 |
| 4,741,588 | 5/1988 | Nicia et al. | 350/96.19 |
| 4,873,697 | 10/1989 | Haeussler et al. | 350/96.18 X |
| 4,885,732 | 12/1989 | Sunagawa et al. | 350/96.15 X |

OTHER PUBLICATIONS

Shogo Ura, Toshiaki, Suhara, Hiroshi Nishinara, Member IEEE, and Jiro Koyama, "An Integrated-Optic Disk Pickup Device", *Journal of Lightwave Technology*, vol. LT-4, No. 7, Jul. 1986, p. 913 et seq.
"Nonlinear Polysilane Thin Films", presented in Jul., 1988 in Tokyo University.

*Primary Examiner*—William L. Sikes
*Assistant Examiner*—Phan T. Heartney
*Attorney, Agent, or Firm*—Henry E. Otto, Jr.; Douglas R. Millett

[57] ABSTRACT

An improved apparatus and method for detecting the polarization state of an optical wavefront is disclosed, which is especially suitable for use in an integrated magneto-optic recording head. An optically transparent waveguide structure transmits TE and TM modes of the wavefront propagated as a beam coupled into the waveguide by a TE/TM grating coupler. In the waveguide structure is a periodic structure comprising a birefringent mode separator that splits the propagating beam into TE and TM modes. The mode separator comprises an array of uniformly spaced volumes of identical configuration. Photosensitive devices detect the intensity of the light contained within each of the separated beams. The signals from these photosensitive devices are used to determine the state of polarization of the optical wavefront. The periodic structure may, if desired, comprise regions of alternating birefringence, such as a Bragg grating, either in a waveguide layer or a cladding layer. Focal power is introduced (1) by providing focal power in the input grating coupler to the waveguide with a curved grating structure, (2) by varying the pitch of the birefringent mode separator extending in a direction transverse to the optical axis of the propagating beam, or (3) by introducing a surface grating with a varying pitch in a direction transverse of the optical axis.

19 Claims, 2 Drawing Sheets

DATA = (A+B)−C
TES = A−B
FES = (A+B)−C

DATA = (A+B)−(C+D)
TES = A−B
FES = (A+B)−(C+D)

DETECTING POLARIZATION STATE OF AN OPTICAL WAVEFRONT

This invention relates to an apparatus and method for detecting the polarization state of an optical wavefront, and relates more particularly to an integrated optical head especially suitable for magneto-optic detection systems.

BACKGROUND OF THE INVENTION

Integrated optical heads for optical storage have heretofore been proposed. Integrated optical heads offer several advantages over conventional optical heads comprising a plurality of discrete components. Integrated heads can be made lighter and smaller than current heads because the function of several discrete optical elements is condensed onto a planar waveguide. Integrated heads are more easily manufacturable because waveguide optical components and associated electronic elements are fabricated in the same series of steps using lithography and thin film deposition.

One configuration of a typical optical head is described in the July 1986 issue of the *Journal of Lightwave Technology* at pp. 913 et seq. The optical head disclosed therein comprises a laser diode, a focusing or nonfocusing grating out-coupler, a return-beam beamsplitter, and data and servo detectors. Such an optical head is suitable for use in optical storage drives, such as CD-ROM, write-once, phase-change, and dye-bit drives, wherein data encoding is based upon the intensity or optical phase modulations of the return beam. In this type of optical storage drive, the optical components of the drive do not need to separate or detect the polarization state of the return beam.

By contrast, in magneto-optic storage drives, wherein the data is encoded as polarization changes, the optical components must separate and detect the polarization state of the return beam.

The most pertinent prior art of which applicants are aware is the hybrid integrated magneto-optic detection system described in *Technical Digest* FA-7 of a paper presented by H. Sunagawa et al., at the International Symposium on Optical Memory, held in Tokyo, Sept. 16-18, 1987. In their detection system, the polarization separation is performed by three separate parallel-arranged grating couplers. The outer two grating couplers are adjacent the edges of the aperture; i.e., the area which collects the light. These outer grating couplers couple only transverse electric (TE) polarization, whereas the grating in the center couples only transverse magnetic (TM) polarization. The two outer couplers couple only TE polarization and the central coupler couples only TM polarization because of a slight variation in pitch of only 0.0034 microns. Each coupled wave is focused to a respective detector area. A pair of detectors in each of the two outer detector areas detect the TE polarization and provide focusing and tracking information, respectively. A single detector in the central detector area detects the TM polarization. The magneto-optic signal is proportional to the difference in light intensity between the TE and TM detectors.

Although the system just described constitutes a complete magneto-optic head capable of detecting data and providing focus and track error signals, the return beam aperture is segmented; and, as a result, only about one-half of the available light is utilized. The polarization state of the entire aperture is not analyzed, thereby reducing both the lateral resolution and magnitude of the data signal. Also, unless the pitch differential between the grating couplers (0.0034 microns) is very precisely controlled, cross-talk will occur between the coupling of the TE and TM modes.

In a paper entitled "Nonlinear Polysilane Thin Films" presented in July 1988 at Tokyo University and published in the proceedings of the conference, there is disclosed a class of polysilane polymers that exhibit photo-introduced birefringence, and wherein the maximum induced birefringence is sufficient to allow fabrication of channel waveguides by photoexposure. However, a channel waveguide does not in itself provide any polarization mode separation. Although the maximum induced birefringence is stated to be approximately the same as the birefringence between TE and TM modes in unexposed films, this paper does not teach that TE/TM mode separation may be accomplished with a periodic birefringent structure, and it describes no embodiments or applications for the phenomenon.

SUMMARY OF THE INVENTION

According to the invention, there is provided an improved apparatus and method for detecting the polarization state of an optical wavefront. The apparatus comprises an optically transparent waveguide structure which transmits the TE and TM modes of the wavefront propagated as a beam coupled into the waveguide by a TE/TM grating coupler. The waveguide structure may comprise a waveguide layer alone or in combination with an adjacent cladding layer. In or adjacent the waveguide structure is a repetitively-patterned so-called periodic structure that comprises a birefringent mode separator that splits the propagating beam into TE and TM modes. The mode separator may be in the form of an array of uniformly spaced volumes of identical configuration either in the waveguide or in a layer adjacent thereto. Photosensitive devices are positioned to detect the intensity of the light contained within each of the separated beams. The signals from the photosensitive devices are used to determine the state of polarization of the optical wavefront.

The periodic structure may, if desired, comprise regions of alternating birefringence, such as a Bragg grating, either in the waveguide layer or cladding layer. Focal power is introduced by either providing focal power in the input grating coupler to the waveguide with a curved grating structure, by varying the pitch of the birefringent mode separator extending in a direction transverse to the optical axis of the propagating beam, or by introducing a surface grating with a varying pitch in a direction transverse of the optical axis.

This apparatus and method is especially suitable for incorporation in an efficient integrated magneto-optic recording head.

DESCRIPTION OF PREFERRED EMBODIMENTS

Figure 1A:
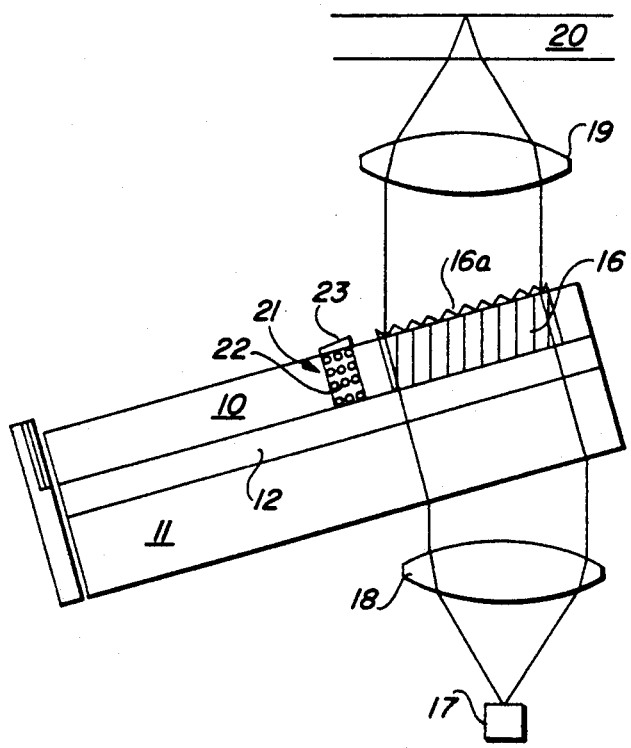
FIG. 1A is a side elevational view of a magneto-optic head embodying the invention and including an integrated magneto-optic system for detecting the polarization state of an optical wavefront.

As illustrated in FIGS. 1A,B,C, the invention is embodied in an integrated magneto-optic detection system constituting part of a magneto-optic recording head for writing and reading data on a magneto-optic disk. As shown, the system comprises a single layer optical waveguide 10 supported on a transparent substrate 11, with or without an optional buffer layer 12 therebetween. Substrate 11 is preferably of glass or a transparent polymer; and buffer layer 12 (if used) may be of silicon dioxide.

Mounted, preferably at one end of waveguide 10, are a TM detector 13 and a TE detector 14. Adjacent one end of waveguide 10 is a TE/TM grating coupler 16 having a grating 16a formed in the exposed (upper) flat surface of waveguide 10.

Figure 1B:
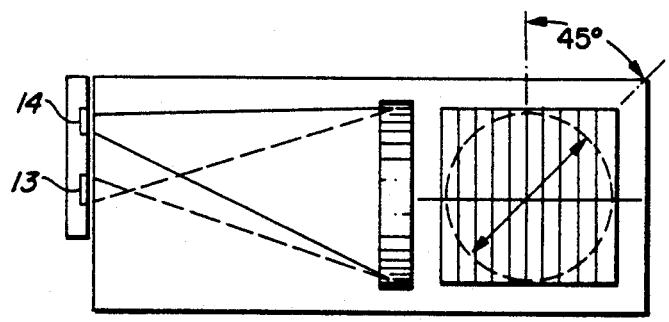
FIG. 1B is a top plan view of the integrated head.

A laser diode 17 directs a polarized beam of light via a collimating lens 18, substrate 11, and buffer 12 if present, to the grating of coupler 16. The incident polarization axis is 45 degrees to the grating coupler, as shown in FIG. 1B. Most of the light is transmitted through the grating to a focusing lens 19, but a portion of the light propagates away from the detectors. The beam from lens 19 is directed to and reflected from a magneto-optic disk 20. The polarization direction of the light reflected from magneto-optic disk 20 is modulated by a small angle (approximately 0.5 degrees) via the Kerr effect in either a clockwise or counterclockwise direction depending upon the region being illuminated. This reflected beam containing the modulated information is collimated by lens 19 and coupled into waveguide 10 by grating coupler 16.

Coupler 16 is designed to couple both TE and TM modes. This is accomplished by fabricating a standard surface grating coupler (as described in the first above-cited reference) and then, in accordance with the present invention, introducing enough birefringence in a volume grating structure so that both the modes couple with the same grating pitch. By use of the same grating pitch, the entire aperture can be utilized and directed into the waveguide. By sampling the entire aperture instead of just segments of the aperture, true differential detection of polarization is assured. The coupled light propagates toward a birefringent mode separator comprising a periodic grating structure 21.

Figure 2:
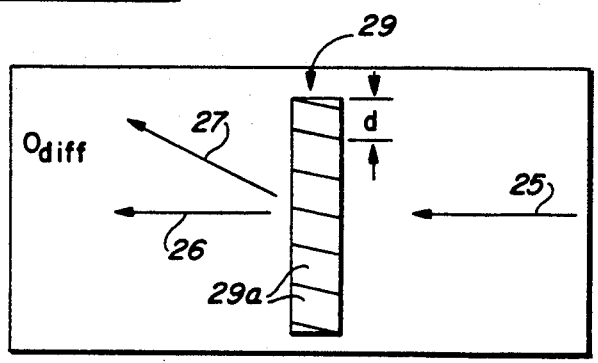
FIG. 2 is a top view diagram depicting the propagation of the TE and TM modes through a birefringent Bragg mode separator in an integrated optical head of the type shown in FIG. 1.

According to an important feature of the invention, the periodic grating structure 21 comprises a matrix of discrete small volumes 22 of a birefringent material. These volumes are of identical configuration and, as illustrated in FIG. 2, have a substantially rectangular cross section. The birefringent volumes are oriented as planes 29a of a Bragg reflector 29. These volumes extend transversely of and substantially completely through the thickness of waveguide 10. Birefringent structure 21 has a surface grating 23 which introduces the same focal power to both TE and TM modes.

The birefringent volume grating of structure 21 is fabricated so that the optical axis is parallel to the electric vector of the TE mode, and the ordinary index of the material is equal to the waveguide layer index. The TM and TE modes see the ordinary and extraordinary indices, respectively, of the birefringent structure 21. The birefringent structure, which forms a pseudo-volume hologram, angularly separates the TE and TM modes by diffraction and by design reduces the focal power of the TE mode. This desirably allows the generation of a focus error signal in conventional manner, as hereinafter described.

The angle of diffraction $\theta_{diff}$ is approximately given by the grating equation, $$\sin\theta_{diff} \approx 2\pi \frac{m}{dk_{eff}} + \sin\theta_{inc}$$

where d is the birefringent volume spacing, $k_{eff}$ is the propagation constant of either the TE or TM waveguide mode, and is dependent upon the wavelength, thicknesses and refractive indices of the waveguide structure, as known from waveguide theory, $\theta_{inc}$ is the angle between the mode propagation vector and the birefringent grating normal, and m is the order of the diffracted wave.

Figure 1C:
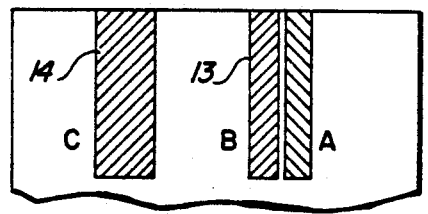
FIG. 1C shows the TM and TE detectors as viewed from the left end of FIG. 1B.

Together with the surface grating 23, the TE and TM modes are concentrated onto the two detectors 13,14 with a focal shift between them as shown in FIG. 1B. Detector 13 is a split detector. As noted in FIG. 1C, the magneto-optic data signal in the beam reflected from disk 20 is the signal A+B of detector 13 less the signal C of detector 14. Also, the focus error signal (FES) is derived in conventional manner and is the signal A+B of detector 13 less the signal C from detector 14. These signals are separated by electronic high pass/low pass filtering. The track error signal (TES) is also derived in conventional manner by subtracting signal B from signal A.

As illustrated in FIG. 2, arrow 25 depicts the direction of TE/TM mode propagation of the light from grating coupler 16. At Bragg reflector 29, the TE mode sees the extraordinary index of refraction of the reflector planes, whereas the TM mode sees the ordinary index of refraction of said planes. If the ordinary index is equal to the index of waveguide 10, the TM mode is propagated unperturbed in the direction of arrow 26; however, the TE mode is diffracted as depicted by arrow 27.

FIG. 2 illustrates how diffraction efficiency is increased by writing a series of birefringent stripes and/or surface relief stripes to form Bragg reflector planes 29a in which the angle of incidence of the mode at each Bragg layer is one-half the diffraction angle $\theta_{diff}$. These stripes form a pseudo-volume hologram and will diffract a larger portion of the TE or TM modes into one diffracted order.

Figure 3A:
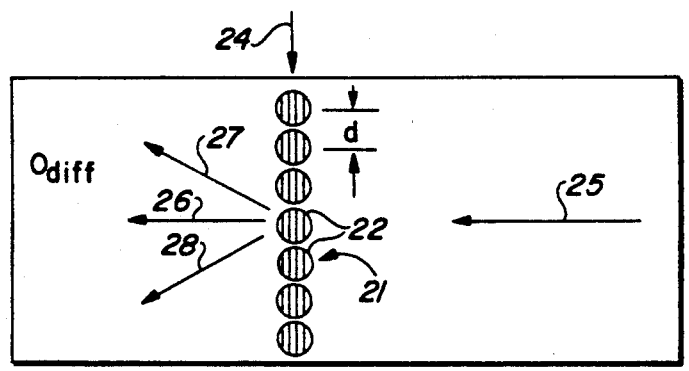
FIG. 3A is a view like FIG. 2 but depicting propagation of the TE and TM modes through an array of birefringent volumes.
Figure 3B:
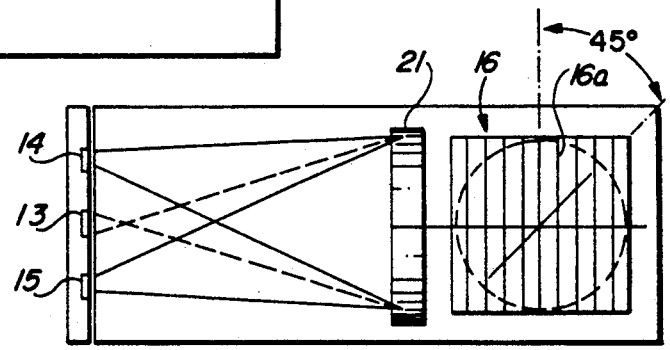
FIGS. 3B and 3C are top and end views similar to FIGS. 1B and 1C, respectively, showing the detectors associated with the array of FIG. 3A.
Figure 3C:
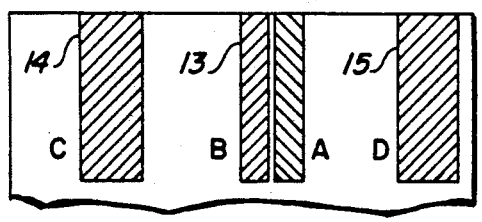

An alternative configuration of birefringent mode separator for a magneto-optic head is shown in FIG. 3. As illustrated, the optical axis 24 of the transversely extending line of birefringent volumes 22 is perpendicular to the direction of TE/TM mode propagation depicted by arrow 25; and the optical axis is also in the plane of waveguide 10. At birefringent structure 21, the TE mode sees the extraordinary index of refraction of the individual volumes 22, while the TM mode sees the ordinary index of refraction of said volumes. If the ordinary index is equal to the index of waveguide 10, the TM mode is propagated unperturbed in the direction of arrow 26; however, the TE mode is split into two diffracted orders, as depicted by arrows 27,28. Since the TE modes are split into two diffracted orders, another TE detector 15 is added and its signal is summed with that of TE detector 14.

As shown in FIGS. 3B and C, detector 15 is positioned such that TM detector 13 is disposed between and equidistant from both TE detectors 14,15. The magneto-optic data signal in the beam reflected from disk 20 is the signal A+B of detector 13 less the sum of the signals C and D from detectors 14,15. The FES is also derived by subtracting the sum of signals C and D from the sum of signals A and B. The TES is derived by subtracting signal B from signal A.

Figure 4:
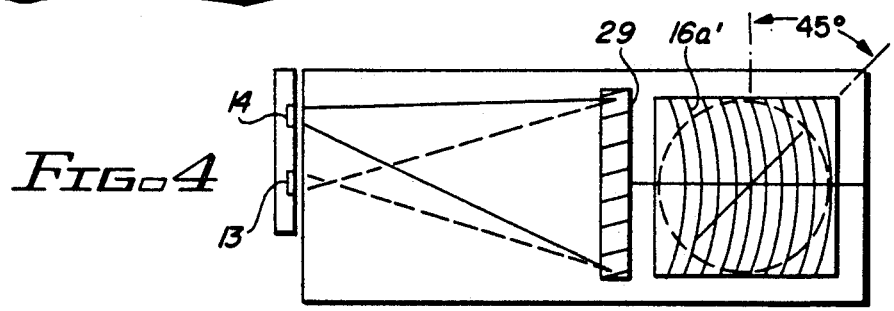
FIG. 4 is a top view of an integrated head according to a variation of the invention, showing a curved input coupler to introduce focal power.

According to a variation of the invention illustrated in FIG. 4, coupler 16 has grating 16a' formed as curved grating lines on the flat surface of the waveguide. The centers of curvature of said lines lies on an axis which extends centrally the length of waveguide 10. The curved grating 16a' provides focusing power to concentrate the mode energy in the plane of waveguide 10.

As in the embodiment illustrated in FIG. 3, the grating structure 21' comprises a matrix of discrete small identically configured volumes 22' of a birefringent material. These volumes 22' preferably have a circular cross-section and act as a one-dimensional diffraction grating. As in FIG. 3, these volumes 22' extend transversely of and substantially completely through the thickness of waveguide 10.

The amount of diffracted intensity is dependent on the base index of the waveguide 10, the index of refraction of any cladding layers (like 30 in FIG. 5, hereinafter to be described), the birefringence introduced, and the height of the surface modulations in gratings 16a and 23. If reduced diffraction efficiency is required, the optical axis 24 of the birefringence can be written at an angle to the TE mode; and in this event, the TE mode will experience an intermediate refractive index between the extraordinary and ordinary index and the perturbation of the TE mode will be reduced.

Figure 5:
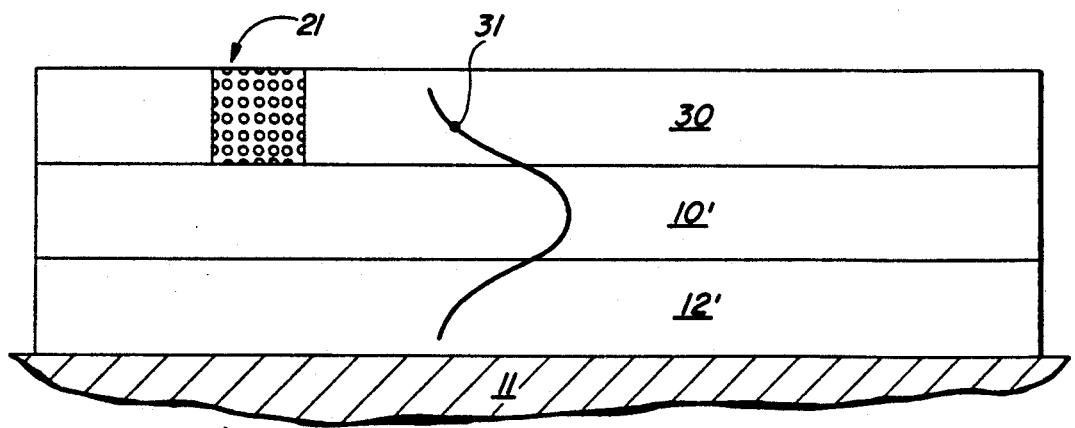
FIG. 5 shows a modified waveguide structure according to another variation of the invention.

According to another variation of the invention, and as shown in FIG. 5, birefringent mode separator 21' is disposed in a cladding layer 30 of a multi-layered waveguide structure. This structure comprises a waveguide layer 10' interposed between cladding layer 30 and a buffer layer 12' that is supported on a transparent substrate 11'. Line 31 illustrates the electric-field distribution of TE mode, showing that energy is distributed into cladding and buffer layers as well as being contained in the waveguide layer. Consequently, it is possible to influence propagation of the TE mode by interacting with the light disturbances in the cladding and/or buffer layers.

The birefringent material used to form waveguide layer 10 (or layers 10',30) and the birefringent volume grating structures formed therein are preferably polysilanes of the type described in the last of the above-cited background references. Poly-di-n-butyl, poly-di-n-pentyl and poly-di-n-hexylsilane can be spin coated to form films with thicknesses from 100 nm to over 3 microns. These films are smooth and capable of supporting waveguide modes. Intense visible light exposure induces polymer chain scission. This introduces birefringence with the optical axis parallel to the polarization of the exposure illumination.

It will thus be seen that the polarization beamsplitter for waveguide optics according to the invention uses birefringent volume gratings in the waveguide or cladding layer to diffract and spatially separate the TE and TM modes. The diffraction efficiency can be controlled by adjusting the angle between the optical axis of the birefringence and the electric vector of the TE mode. Surface gratings can be combined with the birefringent structures to augment or fine tune the diffraction of the beamsplitter. If the lines or grooves in the coupler grating are curved, no additional focal power is needed. The invention has been illustrated as embodied in a magneto-optic head comprising a magneto-optic detection system wherein a birefringent grating coupler couples into the waveguide both the TE and TM polarizations of the return beam from the medium. A birefringent periodic structure acts as a birefringent mode separator to spatially separate the TE and TM modes across the entire return beam. The separated modes are focused and detected. The magneto-optic data signal is the difference between the TM and TE mode signals.

While the invention has been shown and described with respect to preferred embodiments thereof, it will be understood by those skilled in the art that changes in form and detail may be made in these embodiments without departing from the scope and teaching of the invention. Accordingly, the apparatus and method herein disclosed are to be considered merely as illustrative, and the invention is to be limited only as specified in the claims.

We claim:

1. An apparatus for detecting the polarization state of a propagated optical wavefront, comprising:
    an optically transparent waveguide structure for transmitting a beam comprising overlapping transverse electric (TE) and transverse magnetic (TM) modes of said propagated optical wavefront, said TE and TM modes overlapping each other across the entire cross-section of the beam;
    a periodic structure of birefringent material located within the waveguide structure for receiving said beam from the waveguide structure and for spatially separating the overlapping TE and TM modes of the beam into respective separated non-overlapping beams; and
    photosensitive devices positioned to detect the intensity of the light contained within each of the separated beams and generate respective output signals corresponding thereto for use in determining the state of polarization of the wavefront.

2. The apparatus of claim 1, wherein the birefringent material is in the form of uniformly shaped volumes of substantially identical configuration in said waveguide structure.

3. The apparatus of claim 1, wherein the waveguide structure comprises a waveguide layer and a cladding layer adjacent thereto, and the birefringent material is in the form of uniformly spaced volumes of substantially identical configuration in the cladding layer.

4. The apparatus of claim 1, wherein said periodic structure substantially separates the modes by diffracting said beam.

5. The apparatus of claim 1, wherein said periodic structure comprises regions of alternating birefringence.

6. The apparatus of claim 1, wherein the birefringence of the birefringent material is photoinduced.

7. The apparatus of claim 1, wherein the birefringent material is polysilane.

8. The apparatus of claim 1, further including a TE/TM coupler comprising a birefringent volume grating associated with a surface grating, for transmitting to the waveguide structure a beam comprising overlapping TE and TM modes, said TE and TM modes overlapping each other across the entire cross-section of the beam.

9. The apparatus of claim 1, further including a TE/TM coupler having combined surface grating and birefringent volume grating with a curved configuration to introduce focal power into said beam for transmitting to the waveguide structure a beam comprising overlapping TE and TM modes, said TE and TM modes overlapping each other across the entire cross-section of the beam.

10. The apparatus of claim 9, wherein said apparatus constitutes a magneto-optic detection system for an integrated magneto-optic recording head.

11. An apparatus for detecting a polarization state of a propagated optical wavefront, comprising:
an optically transparent waveguide structure comprising a birefringent coupler for transmitting a beam comprising overlapping transverse electric (TE) and transverse magnetic (TM) modes of said propagated optical wavefront, said TE and TM modes overlapping each other across the entire cross-section of the beam;
a birefringent periodic structure located within the waveguide structure for receiving said beam from the waveguide structure and for spatially separating the overlapping TE and TM modes of the beam into respective separated non-overlapping beams; and
photosensitive devices positioned to detect the intensity of the light contained within each of the separated beams and generate respective output signals corresponding thereto for use in determining the state of polarization of the wavefront.

12. The apparatus of claim 11, wherein said birefringent periodic structure is a birefringent Bragg reflector with an optical axis parallel to the polarization direction of the TE mode.

13. The apparatus of claim 11, wherein the birefringent coupler has a curved surface grating with a single center of curvature for providing focal power.

14. The apparatus of claim 11, wherein the waveguide structure comprises a waveguide layer and a cladding layer adjacent thereto, and the birefringent periodic structure is in the form of uniformly spaced volumes of substantially identical configuration in the cladding layer.

15. The apparatus of claim 11, wherein the periodic structure comprises regions of alternating birefringence.

16. A method for detecting the polarization state of a propagated optical wavefront, comprising the steps of:
directing into an optically transparent waveguide structure a beam comprising overlapping transverse electric (TE) and transverse magnetic (TM) modes of the propagated optical wavefront, the TE and TM modes overlapping each other across the entire cross-section of the beam;
spatially separating the TE and TM modes of the beam into respective separated non-overlapping beams by use of a birefringent periodic structure located within said waveguide structure;
detecting the intensity of the light contained within each of the separated beams; and
generating respective output signals corresponding to the respective intensities of the separated beams for determining the state of polarization of the wavefront.

17. The method of claim 16, further including the step of diffracting said beam to effect said spatial separation of the modes.

18. The method of claim 16, including the step of associating with the waveguide structure a TE/TM coupler having a birefringent volume grating for transmitting the beam to the periodic structure.

19. The method of claim 16, wherein the waveguide structure comprises polysilane, and including the step of exposing the polysilane to intense visible light in a preselected region to transform said region into said birefringent periodic structure.

* * * * *